(12) United States Patent
Liu et al.

(10) Patent No.: US 12,422,684 B2
(45) Date of Patent: Sep. 23, 2025

(54) PROJECTION MECHANISM AND GLASSES

(71) Applicant: GOERTEK INC., Shandong (CN)

(72) Inventors: Juan Liu, Shandong (CN); Feng Zhang, Shandong (CN); Katsumi Saito, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 204 days.

(21) Appl. No.: 18/247,012

(22) PCT Filed: Nov. 1, 2021

(86) PCT No.: PCT/CN2021/127817
§ 371 (c)(1),
(2) Date: Mar. 28, 2023

(87) PCT Pub. No.: WO2022/188435
PCT Pub. Date: Sep. 15, 2022

(65) Prior Publication Data
US 2023/0359047 A1    Nov. 9, 2023

(30) Foreign Application Priority Data

Mar. 10, 2021   (CN) .......................... 202110263356.4

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC ................................................ G02B 27/0176
USPC ............................................................ 351/158
See application file for complete search history.

(56) References Cited

U.S. PATENT DOCUMENTS

2019/0265482 A1    8/2019   Hwang et al.

FOREIGN PATENT DOCUMENTS

| CN | 101846801 A | 9/2010 |
|----|-------------|--------|
| CN | 108333794 A | 7/2018 |
| CN | 210690947 U | 6/2020 |
| CN | 111433658 A | 7/2020 |
| CN | 210924102 U | 7/2020 |
| CN | 111736352 A | 10/2020 |
| CN | 113031271 A | 6/2021 |
| JP | 2010239282 A | 10/2010 |
| KR | 1020180009932 A | 1/2018 |

*Primary Examiner* — James R Greece
(74) *Attorney, Agent, or Firm* — Ingrassia Fisher & Lorenz, LLP

(57) ABSTRACT

A projection mechanism and glasses are disclosed. The projection mechanism comprises an arc-shaped guide rail, a mounting bracket and a projection assembly. The mounting bracket is slidably arranged on the arc-shaped guide rail. The mounting bracket is provided with a through hole. The projection assembly is inserted in the through hole. The arc-shaped guide rail and the mounting bracket are respectively used to connect the rim and the temples. The mounting bracket can be located at a first position or a second position of the arc-shaped guide rail. When the mounting bracket is located at the first position of the arc-shaped guide rail, a light source output end of the projection assembly faces toward the rim. When the mounting bracket is located at the second position of the arc-shaped guide rail, the projection assembly is far away from the rim.

20 Claims, 6 Drawing Sheets

PROJECTION MECHANISM AND GLASSES

CROSS-REFERENCE TO RELATED APPLICATIONS

This application is a U.S. National-Stage entry under 35 U.S.C. § 371 based on International Application No. PCT/CN2021/127817, filed Nov. 1, 2021 which was published under PCT Article 21(2) and which claims priority to Chinese Application No. 202110263356.4, filed Mar. 10, 2021, which are all hereby incorporated herein in their entirety by reference.

TECHNICAL FIELD

This application pertains to the technical field of virtual reality equipment, in particular to a projection mechanism and glasses using the projection mechanism.

BACKGROUND

As the virtual reality technology is becoming mature, two different product forms, i.e., all-in-one machine and light intelligence, have gradually emerged. As a consumer-oriented product, light intelligent glasses comprise a light projection engine and optical elements, the light projection engine irradiates the beam on the optical elements, and the optical elements realize imaging. In order to achieve the structural stability and accuracy of light intelligent glasses, the light projection engine and optical elements are fixed with respect to each other. In other words, optical elements and light projection engine are installed on the rim of glasses. Thus, when the temples are folded relative to the rim, the light projection engine protrudes from one side of the rim. The thickness of the rim is large, the temples cannot closely overlap with the rim, thus the glasses are difficult to be folded and accommodated. In addition, other objects, desirable features and characteristics will become apparent from the subsequent summary and detailed description, and the appended claims, taken in conjunction with the accompanying drawings and this background.

SUMMARY

The object of the present disclosure is to provide a projection mechanism, which can improve the structural compactness of glasses and realize the miniaturization of glasses.

To achieve the above object, the projection mechanism proposed in the present disclosure comprises:
an arc-shaped guide rail;
a mounting bracket slidably arranged on the arc-shaped guide rail and provided with a through hole; and
a projection assembly inserted in the through hole;
wherein the arc-shaped guide rail and the mounting bracket are respectively used to connect the rim and the temples, and the mounting bracket can be located at a first position or a second position of the arc-shaped guide rail; when the mounting bracket is located at the first position of the arc-shaped guide rail, a light source output end of the projection assembly faces toward the rim; when the mounting bracket is located at the second position of the arc-shaped guide rail, the projection assembly is far away from the rim.

In an embodiment of the present disclosure, the mounting bracket comprises:

a sliding seat slidably arranged on the arc-shaped guide rail; and
a mounting seat fixedly connected with the sliding seat and provided with the through hole.

In an embodiment of the present disclosure, the mounting seat comprises:
a cylinder body provided with the through hole; and
a seat body that is connected with a circumference of the cylinder body, protrudes from an end of the cylinder body, and is fixedly connected with the sliding seat.

In an embodiment of the present disclosure, a position-limiting projection is provided on an inner wall surface of the through hole, a position-limiting plane is provided on the projection assembly, and the position-limiting projection and the position-limiting plane are matched for position-limiting.

In an embodiment of the present disclosure, a positioning convex is provided on and protrude from a surface of the arc-shaped guide rail, and is located at an end of the arc-shaped guide rail that is adjacent to the rim;
when the mounting bracket moves towards the rim along the arc-shaped guide rail, the mounting bracket and the positioning convex are matched for position-limiting.

In an embodiment of the present disclosure, a length of the arc-shaped guide rail is greater than or equal to $(2\pi R)*\frac{1}{4}$, where R is a distance from an outer edge to a circle center of the arc-shaped guide rail.

The present disclosure also provides a pair of glasses, which comprises:
a rim assembly comprising a rim and an optical element arranged on the rim;
temples rotatably connected with the rim; and
at least one projection mechanism according to any one of claims 1 to 6, wherein the arc-shaped guide rail of the projection mechanism is connected with the rim, and the mounting bracket of the projection mechanism is fixedly connected with the temples;
when the temple is unfolded relative to the rim, the light source output end of the projection assembly faces toward the optical element.

In an embodiment of the present disclosure, an end of the temple adjacent to the rim is provided with a mounting slot, the mounting bracket is fixedly connected with an inner wall surface of the mounting slot, and the light source output end of the projection assembly of the projection mechanism is located at a slot opening of the mounting slot;
and/or, the rim is provided with a relief hole corresponding to the optical element, the glasses also comprise a flexible pipeline, one end of the flexible pipeline is connected with a peripheral wall of the relief hole, the other end of the flexible pipeline is connected with the mounting bracket and seals the through hole;
and/or, the glasses also comprise a dust-proof net cover, which covers a connection part between the rim and the temple.

In an embodiment of the present disclosure, a first mounting projection and a second mounting projection are provided on and protrude from the rim, and are oppositely arranged and form a movement gap therebetween, the first mounting projection is provided with a first connecting hole, the second mounting projection is provided with a second connecting hole corresponding to the first connecting hole, and the arc-shaped guide rail is arranged on the first mounting projection or the second mounting projection;
the temple is provided with a mounting hole located at a circle center of the arc-shaped guide rail, and a connecting member passes through the first connecting hole, the mounting hole and the second connecting hole, so that the temple is rotatably connected with the first mounting projection and the second mounting projection.

In an embodiment of the present disclosure, the rim assembly comprises two optical elements;

the glasses comprise two projection mechanisms arranged respectively on two sides of the rim, each of the projection mechanisms is connected with one of the temples and is arranged corresponding to one of optical elements.

In the technical solution of the present disclosure, the rim and the temples are connected through the arc-shaped guide rail and the mounting bracket, the arc-shaped guide rail and the mounting bracket are slidably connected, and the projection assembly is arranged on the mounting bracket. When the temple rotates relative to the rim, it drives the mounting bracket to slide on the arc bracket, thereby realizing the stable movement of the projection assembly, so as to improve the positioning accuracy between the projection assembly and the rim. That is to say, the mounting bracket moves along the arc-shaped guide rail, and can be located at a first position and a second position of the arc-shaped guide rail. When the mounting bracket is located at the first position of the arc-shaped guide rail, a light source output end of the projection assembly faces toward the rim, so that the projection assembly is close to the rim, and the projection assembly can project the image onto the rim. When the mounting bracket is located at the second position of the arc-shaped guide rail, the projection assembly is far away from the rim. The projection mechanism of the present disclosure uses the arc-shaped guide rail and the mounting bracket as the connecting members, and the mounting bracket and the arc-shaped guide rail are directionally matched, so that the projection assembly can rotate smoothly between the rim and the temples, thereby improving the positioning accuracy of the projection assembly and the rim, improving the structural compactness of the glasses, and realizing the miniaturization of the glasses.

BRIEF DESCRIPTION OF DRAWINGS

The present invention will hereinafter be described in conjunction with the following drawing figures, wherein like numerals denote like elements, and.

In the drawings.

Figure 1:
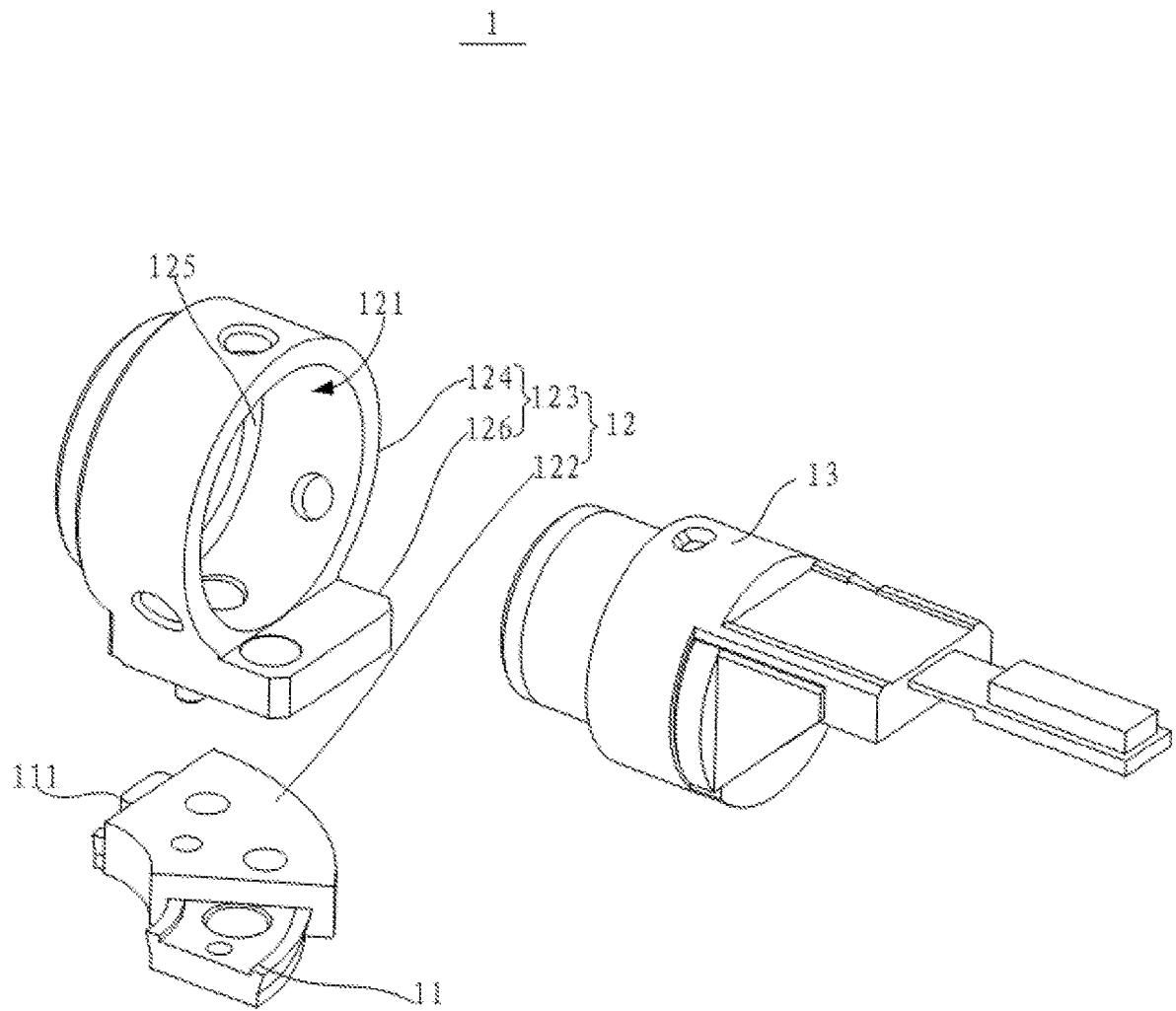
FIG. 1 is a schematic diagram of the structure of an embodiment of the projection mechanism of the present disclosure.

1, projection mechanism; 11, arc-shaped guide rail; 111, positioning convex; 12, mounting bracket; 121, through hole; 122, sliding seat; 123, mounting seat; 124, cylinder body; 125, position-limiting projection; 126, seat body; 13, projection assembly; 131, position-limiting plane; 2, rim assembly; 21, rim; 211, relief hole; 212, first mounting projection; 213, first connecting hole; 214, second mounting projection; 215, second connecting hole; 216, movement gap; 217, rear rim; 218, front rim; 22, optical element; 3, temple; 31, mounting slot; 32, mounting hole; 4, flexible pipeline; 5, dust-proof net cover.

The implementation, functional features and advantages of the present disclosure will be further described with reference to the accompanying drawings in conjunction with the embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In addition, in the present disclosure, the terms "first" and "second" are used for descriptive purposes only and are not to be construed as indicating or implying relative importance or implicitly indicating the number of indicated technical features. Thus, a feature with "first" or "second" may explicitly or implicitly include at least one such a feature. In addition, the term "and/or" in the full text means that it includes three parallel solutions. Taking "A and/or B" as an example, it includes three solutions: A alone, B alone, and A and B together. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

Figure 2:
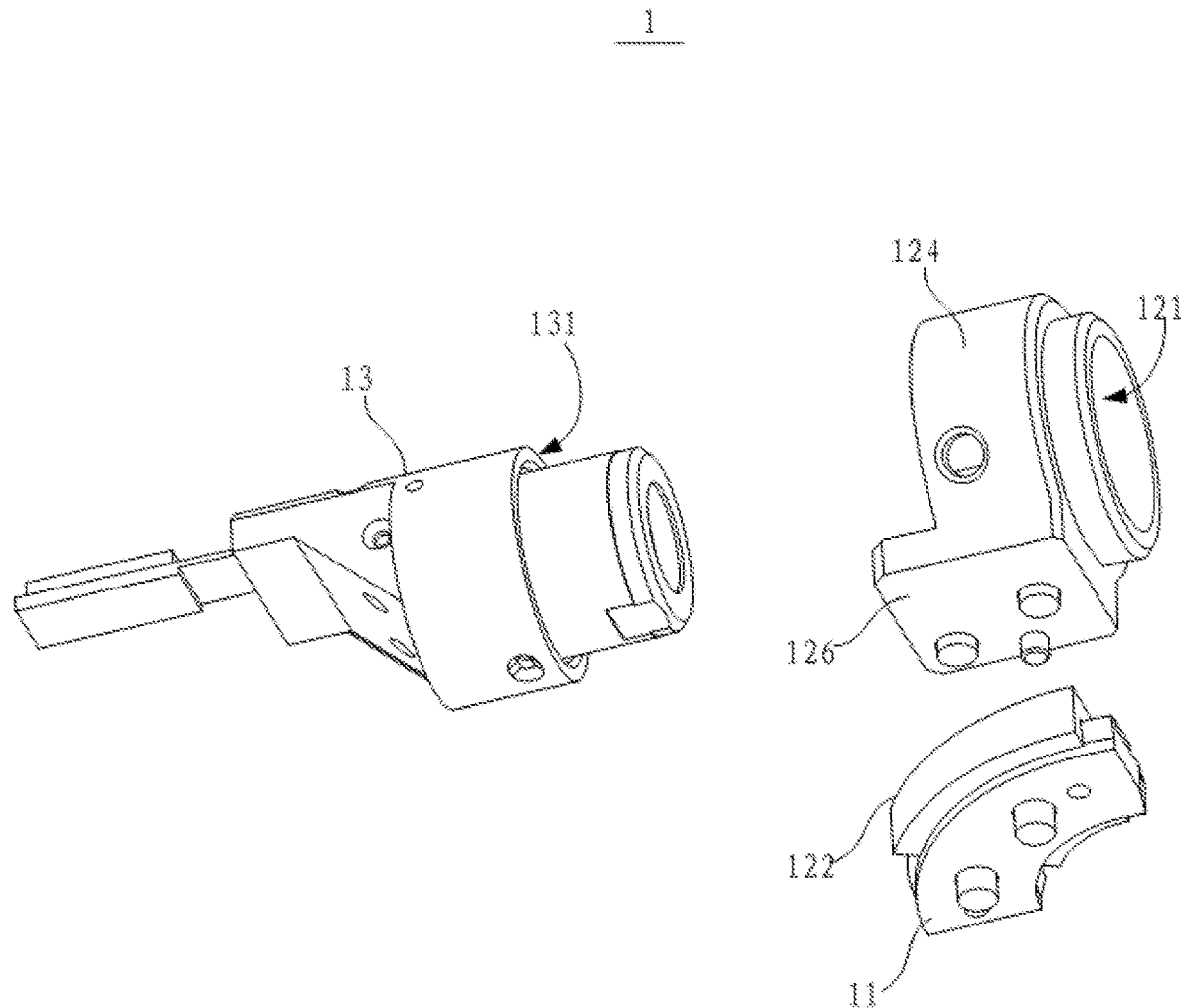
FIG. 2 is a schematic diagram of the structure of the projection mechanism in FIG. 1 seen from another viewing angle.
Figure 3:
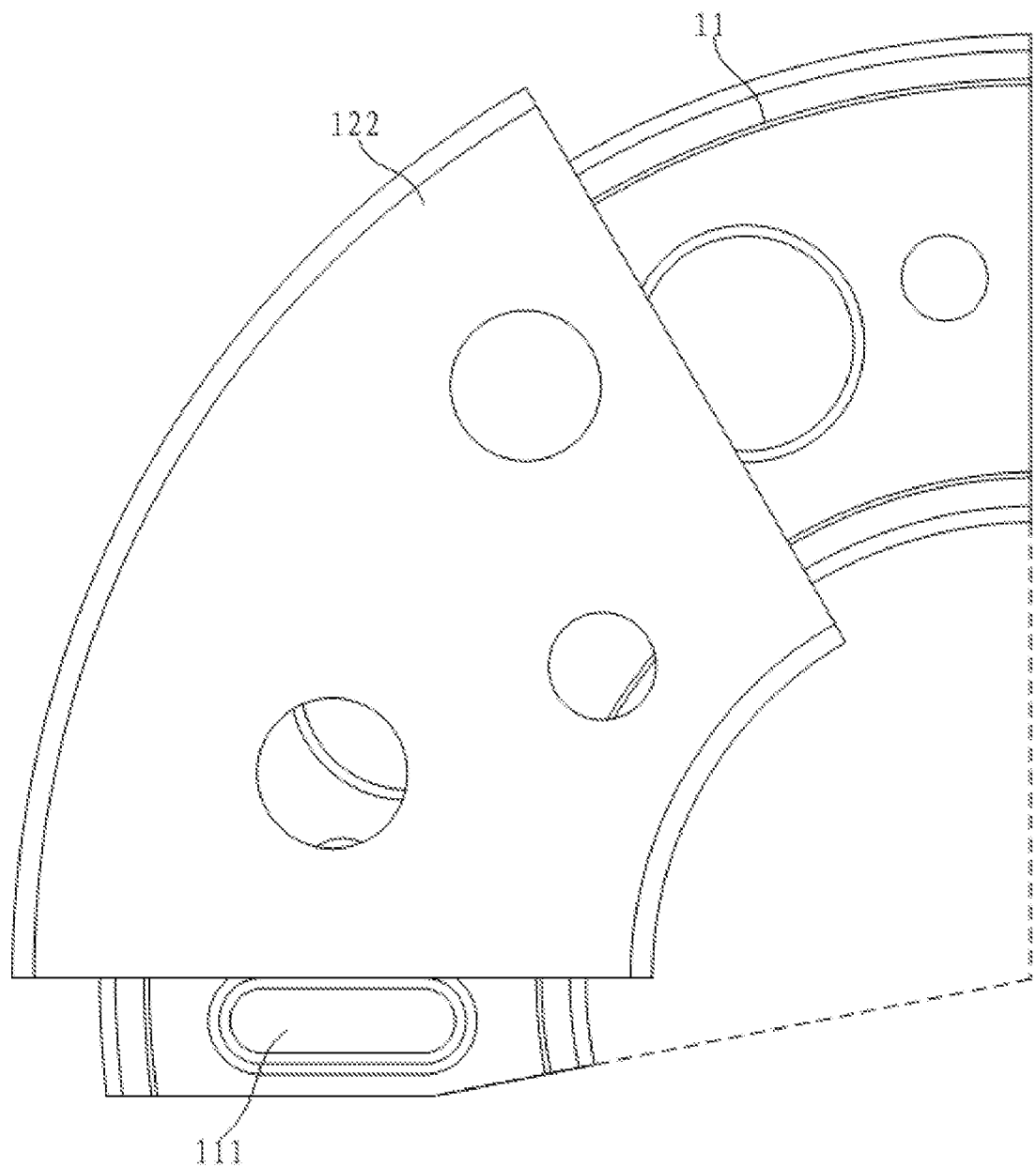
FIG. 3 is a schematic diagram of the installation of an arc-shaped guide rail and a sliding seat in FIG. 1.
Figure 4:
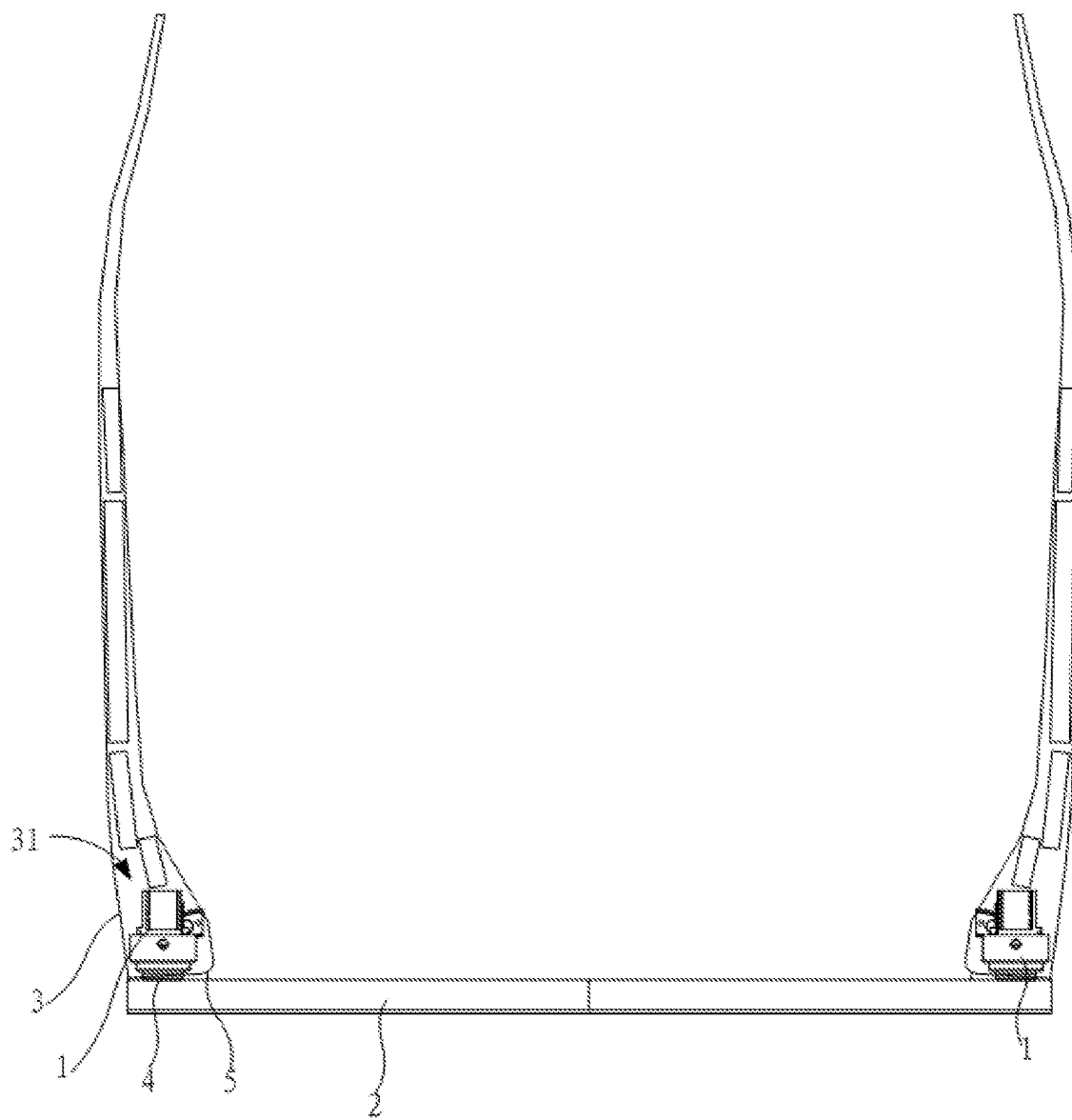
FIG. 4 is a schematic diagram of an unfolded state of the glasses of the present disclosure.
Figure 5:
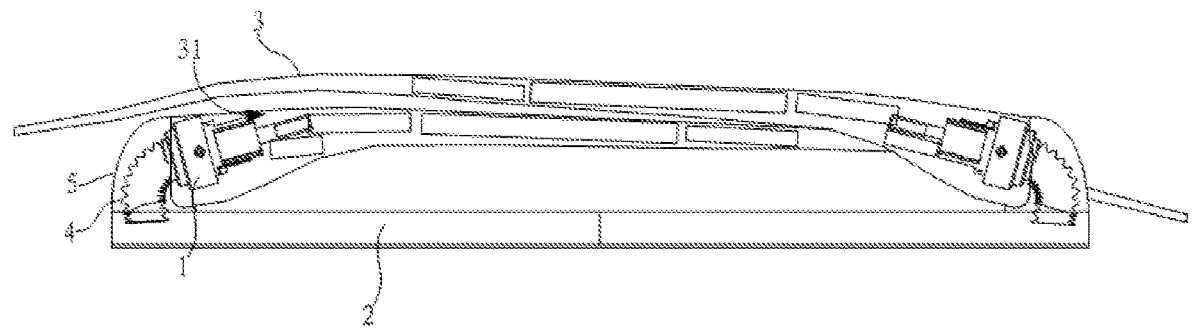
FIG. 5 is a schematic diagram of the structure of the glasses in a folding state of the present disclosure.

The present disclosure proposes a projection mechanism applied to glasses. The glasses comprise a rim and temples, and the rim has an imaging area. The projection mechanism is arranged between the rim and the temple, and projects the image to the imaging area of the rim, so that the user can view the image. Refer to FIGS. 1-7, among which FIG. 1 is a schematic diagram of the structure of an embodiment of the projection mechanism of the present disclosure, FIG. 2 is a schematic diagram of the structure of the projection mechanism in FIG. 1 seen from another viewing angle, FIG. 3 is a schematic diagram of the installation of an arc-shaped guide rail and a sliding seat in FIG. 1, FIG. 4 is a schematic diagram of the unfolded state of the glasses of the present disclosure, FIG. 5 is a schematic diagram of the structure of the glasses in the folding state of the present disclosure, FIG.

Figure 6:
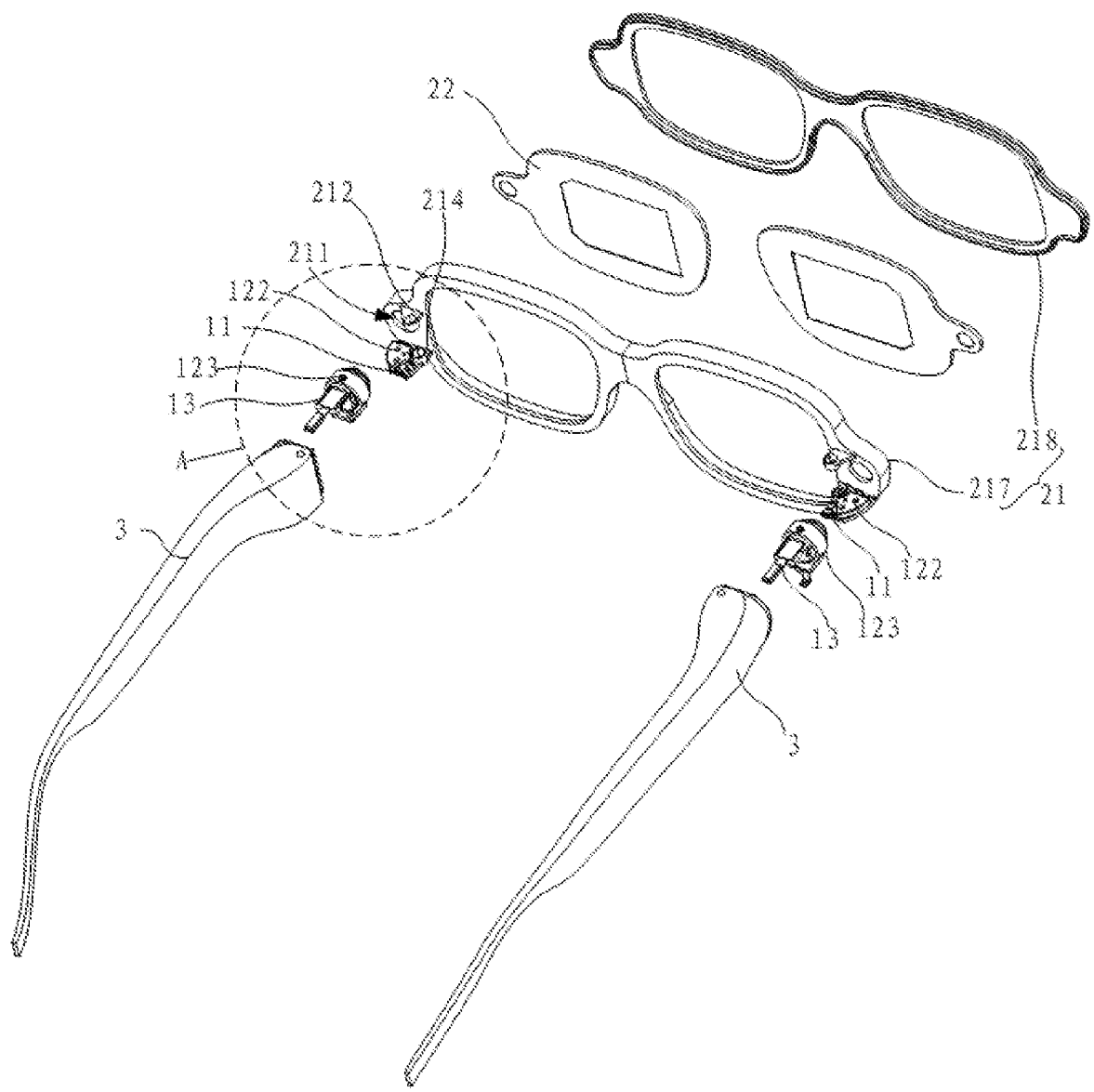
FIG. 6 is a schematic diagram of assembling of the glasses of the present disclosure.
Figure 7:
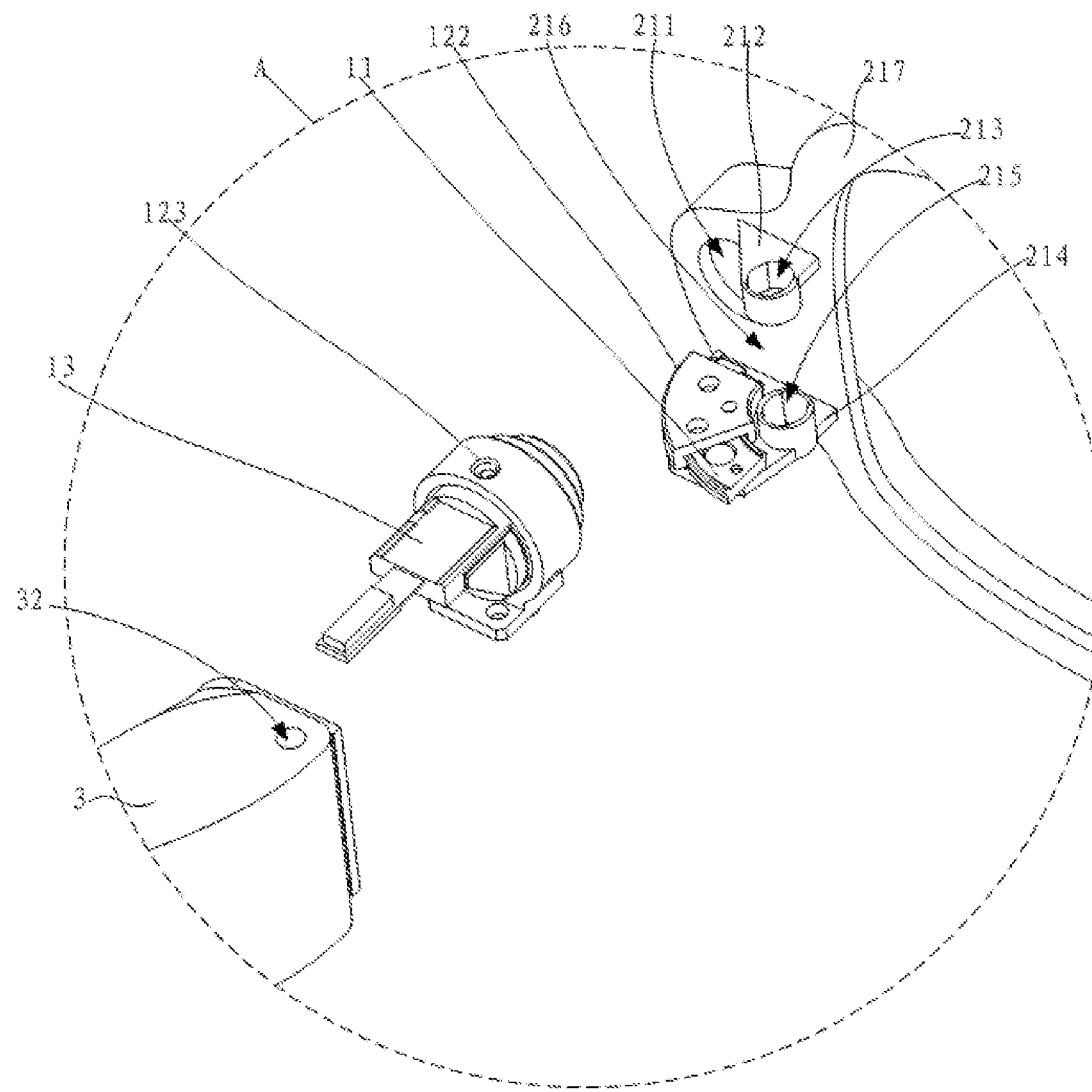
FIG. 7 is a partial enlarged view of part A in FIG. 6.

6 is a schematic diagram of assembling of the glasses of the present disclosure, and FIG. 7 is a partial enlarged view of part A in FIG. 6.

In an embodiment of the present disclosure, as shown in FIG. 1 and FIGS. 2, 3, 6 and 7, the projection mechanism 1 comprises: an arc-shaped guide rail 11, a mounting bracket 12 and a projection assembly 13. The mounting bracket 12 is slidably arranged on the arc-shaped guide rail 11, and is provided with a through hole 121. The projection assembly 13 is inserted in the through hole 121. The arc-shaped guide rail 11 and the mounting bracket 12 are respectively used to connect the rim 21 and the temples 3. The mounting bracket 12 moves along the arc-shaped guide rail 11, so that the mounting bracket 12 drives the projection assembly 13 to be close to or far from the rim 21. Understandably, the mounting bracket 12 moves along the arc-shaped guide rail 11, and can be located at a first position and a second position of the arc-shaped guide rail 11. When the mounting bracket 12 is located at the first position of the arc-shaped guide rail 11, a light source output end of the projection assembly 13 faces toward the rim 21. When the mounting bracket 12 is located at the second position of the arc-shaped guide rail 11, the projection assembly 13 is far away from the rim 21. The projection mechanism of the present disclosure uses the arc-shaped guide rail 11 and the mounting bracket 12 as the connecting members, and the mounting bracket 12 and the arc-shaped guide rail 11 are directionally matched, so that the projection assembly 13 can rotate smoothly between the rim 21 and the temples 3, thereby improving the positioning accuracy of the projection assembly 13 and the rim 21, improving the structural compactness of the glasses, and realizing the miniaturization of the glasses.

In this embodiment, the rim 21 and the temples 3 are connected through the arc-shaped guide rail 11 and the mounting bracket 12, the arc-shaped guide rail 11 and the mounting bracket 12 are slidably connected, and the projection assembly 13 is arranged on the mounting bracket 12. When the temple 3 rotates relative to the rim 21, it drives the mounting bracket 12 to slide on the arc bracket, thereby realizing the stable movement of the projection assembly 13, so as to improve the positioning accuracy between the projection assembly 13 and the rim 21. In other words, the mounting bracket 12 can be located at a first position and a second position of the arc-shaped guide rail 11. When the mounting bracket 12 is located at the first position of the arc-shaped guide rail 11, a light source output end of the projection assembly 13 faces toward the rim 21, so that the projection assembly 13 is close to the rim 21, and the projection assembly 13 can project an image onto the rim 21. When the mounting bracket 12 is located at the second position of the arc-shaped guide rail 11, the projection assembly 13 is far away from the rim 21. The projection mechanism 1 of the present disclosure uses the arc-shaped guide rail 11 and the mounting bracket 12 as the connecting members, so that the projection assembly 13 can rotate smoothly between the rim 21 and the temples 3, thereby improving the positioning accuracy of the projection assembly 13 and the rim 21, improving the structural compactness of the glasses, and realizing the miniaturization of the glasses.

In an optional embodiment of the present disclosure, an optical element 22 on the rim 21 is a light guiding lens, for example, a lens made of glass.

In an optional embodiment of the present disclosure, the optical element 22 on the rim 21 is a displaying screen.

In an optional embodiment of the present disclosure, the projection line segment from the axis of the through hole 121 to the arc-shaped guide rail 11 forms an included angle with the inner diameter from the arc-shaped guide rail 11 to the mounting bracket 12. That is to say, the arc-shaped guide rail 11 has a bearing surface, the mounting bracket 12 is provided on the arc-shaped guide rail 11 and is located on the bearing surface, the projection line segment of the mounting bracket 12 is located on the front face of the arc-shaped guide rail 11, the projection line segment intersects the arc edge of the arc-shaped guide rail 11, and the projection line segment forms an included angle with the inner diameter from the circle center of the arc-shaped guide rail 11 to the intersection of the projection line segment and the arc-shaped guide rail 11.

In an optional embodiment of the present disclosure, the projection mechanism has an expanded state and a retracted state. In the expanded state, the mounting bracket 12 moves along the arc-shaped guide rail 11 to make the projection assembly 13 to be close to the rim 21. In the retracted state, the mounting bracket 12 moves along the arc-shaped guide rail 11 to make the projection assembly 13 to be far away from the rim 21.

Based on the above, when the projection mechanism is in the expanded state, the rim 21 and the temple 3 are also in an unfolded state. The mounting bracket 12 moves along the arc-shaped guide rail 11, so that the mounting bracket 12 is located at the first position of the arc-shaped guide rail 11 close to the rim 21, and the light source output end of the projection assembly 13 faces toward the rim 21. For example, the light source output end of the projection assembly 13 faces toward the optical element 22 on the rim 21.

On the other hand, when the projection mechanism is in a retracted state, the rim 21 and the temple 3 are also in a retracted state, and the temple 3 and the rim 21 are folded. The mounting bracket 12 moves along the arc-shaped guide rail 11, so that the mounting bracket 12 is located at a second position where the arc-shaped guide rail 11 is far away from the rim 21, so that the light source output end of the projection assembly 13 is far away from the rim 21.

In an optional embodiment of the present disclosure, one end of the arc-shaped guide rail 11 is connected with the rim 21, and the other end is a free end away from the rim 21. The end of the arc-shaped guide rail 11 that is adjacent to the rim 21 is the first position, and the end of the arc-shaped guide rail 11 that is away from the rim 21 is the second position.

In an optional embodiment of the present disclosure, the projection assembly 13 at least comprises an optical engine having a light source output end.

In an optional embodiment of the present disclosure, as shown in FIGS. 4 and 5, the arc-shaped guide rail 11 may be installed on the rim 21, the mounting bracket 12 may be installed on the temple 3, and the temple 3 rotates relative to the rim 21, so that the mounting bracket 12 slides smoothly on the arc-shaped guide rail 11, drives the projection assembly 13 to move smoothly, and thus makes the projection assembly 13 on the mounting bracket 12 to be close to or far from the rim 21.

In an optional embodiment of the present disclosure, as shown in FIGS. 4 and 5, the rim 21 and the temple 3 may be rotatably connected by a rotating shaft located at the circle center of the arc-shaped guide rail 11. That is to say, on the premise that there is a stable connection between the rim 21 and the temple 3, the arc-shaped guide rail 11 is provided on the rim 21, and the mounting bracket 12 is installed on the temple 3, thereby improving the structural stability of the glasses, reducing the shaking between the temple 3 and the rim 21, and thus reducing the shaking of the mounting bracket 12 on the arc-shaped guide rail 11, and improving the positioning accuracy of the projection assembly 13 and the rim 21.

In an optional embodiment of the present disclosure, the arc-shaped guide rail 11 may be embedded into the rim 21. That is to say, one end of the arc-shaped guide rail 11 is embedded in the rim 21, or a part of the arc section of the arc-shaped guide rail 11 is embedded in the rim 21.

In an optional embodiment of the present disclosure, at least one mounting projection may be provided on a side face of the rim 21 facing the temple, and the arc-shaped guide rail 11 is provided on the mounting projection.

In an optional embodiment of the present disclosure, the arc-shaped guide rail 11 may be spaced from the temple 3. That is, when the temple 3 rotates relative to the rim 21, the arc-shaped guide rail 11 is located on one side of the temple 3.

In an optional embodiment of the present disclosure, the arc-shaped guide rail 11 may be partially accommodated in the temple 3. That is to say, the temple 3 is provided with a via hole or a slot corresponding to the arc-shaped guide rail 11. When the temple 3 rotates relative to the rim 21, the arc-shaped guide rail 11 can be extended into the via hole or slot.

In an optional embodiment of the present disclosure, a side face of the mounting bracket 12 is provided with a slide groove, and the arc-shaped guide rail 11 is slidably arranged in the slide groove. That is to say, the outline of the slide groove matches with the arc-shaped guide rail 11, and the mounting bracket 12 slides relative to the arc-shaped guide rail 11.

In an optional embodiment of the present disclosure, the arc-shaped guide rail 11 is provided with a slide groove, and the mounting bracket 12 partially extends into the slide groove.

In an embodiment of the present disclosure, as shown in FIGS. 1 and 2, the mounting bracket 12 comprises: a sliding seat 122 and a mounting seat 123. The sliding seat 122 is slidably arranged on the arc-shaped guide rail 11. The mounting seat 123 is fixedly connected with the sliding seat 122, and is provided with the through hole 121.

In this embodiment, the sliding seat 122 and the mounting seat 123 are separated. The sliding seat 122 may be slidably installed on the arc-shaped guide rail 11 first, and then the mounting seat 123 may be installed on the sliding seat 122 to improve the flexibility of installation. That is, the mounting bracket 12 is divided into the sliding seat 122 and the mounting seat 123 to reduce the volume of a single component and improve the flexibility of installation. On the other hand, whenever the sliding seat 122 or the mounting seat 123 is damaged, the sliding seat 122 or the mounting seat 123 can be replaced separately, thereby effectively improving the maintainability of the projection mechanism 1.

In an embodiment of the present disclosure, as shown in FIG. 1 and FIG. 2, the sliding seat 122 is provided with a slide groove whose shape matches the arc-shaped guide rail 11. Two side edges of the slide groove and the side edges of the arc-shaped guide rail 11 are matched for position-limiting.

In an embodiment of the present disclosure, as shown in FIGS. 1 and 2, the mounting seat 123 comprises a cylinder body 124 and a seat body 126. The cylinder body 124 is provided with the through hole 121. The seat body 126 is connected with the circumference of the cylinder body 124, and protrudes from the end of the cylinder body 124. The seat body 126 is fixedly connected with the sliding seat 122.

In this embodiment, the seat body 126 is connected with the circumference of the cylinder body 124, and protrudes from the end of the cylinder body 124, so that the seat body 126 has a larger size, thereby improving the connection tightness between the seat body 126 and the sliding seat 122. On the other hand, as the seat body 126 has a larger size, it facilitates supporting the projection assembly 13 through the seat body 126.

In an optional embodiment of the present disclosure, the size of the seat body 126 is approximately equal to the size of the sliding seat 122.

In an optional embodiment of the present disclosure, the size of the seat body 126 is less than or equal to the size of the sliding seat 122.

In an optional embodiment of the present disclosure, one of the seat body 126 and the sliding seat 122 may be provided with a mounting pin, and the other of the seat body 126 and the sliding seat 122 may be provided with a positioning hole, and the mounting pin is inserted in the positioning hole.

In an optional embodiment of the present disclosure, the sliding seat 122 is provided with a plurality of positioning holes, and the seat body 126 is provided with a plurality of mounting pins, and the mounting pins are inserted in the positioning holes.

In an optional embodiment of the present disclosure, the cylinder body 124 and the seat body 126 are integrally provided.

In an optional embodiment of the present disclosure, the cylinder body 124 and the seat body 126 may be made of metal or plastic.

In an optional embodiment of the present disclosure, the cylinder body 124 and the seat body 126 may be integrally cast.

In an optional embodiment of the present disclosure, the cylinder body 124 and the seat body 126 may be integrally carved.

In an optional embodiment of the present disclosure, the cylinder body 124 and the seat body 126 may be integrally injection molded.

In an embodiment of the present disclosure, as shown in FIG. 1 and FIG. 2, a position-limiting projection 125 is provided on and protrudes from the inner wall surface of the through hole 121, a position-limiting plane 131 is provided on the projection assembly 13, and the position-limiting projection 125 and the position-limiting plane 131 are matched for position-limiting to prevent the projection assembly 13 from projecting too much out of the through hole 121.

In an optional embodiment of the present disclosure, the cylinder body 124 may be provided with a first relief hole, the first relief hole penetrates the inner wall surface of the through hole 121, the periphery of the projection assembly 13 is provided with a second relief hole, and a bolt passes through the first relief hole and the second relief hole to position the projection assembly 13 in the cylinder body 124.

In an embodiment of the present disclosure, a positioning convex 111 is provided on and protrude from the surface of the arc-shaped guide rail 11, and is located at an end of the arc-shaped guide rail 11 that is adjacent to the rim 21. When the mounting bracket 12 moves towards the rim 21 along the arc-shaped guide rail 11, the mounting bracket 12 and the positioning convex 111 are matched for position-limiting to avoid collision between the mounting bracket 12 and the rim 21, which may damage the projection assembly 13.

In an embodiment of the present disclosure, the positioning convex 111 and the arc-shaped guide rail 11 are integrally provided.

In an embodiment of the present disclosure, the positioning convex 111 and the arc-shaped guide rail 11 are separately provided. That is to say, a screw is inserted at one end of the arc-shaped guide rail 11, and the part of the screw that protrudes from the surface of the arc-shaped guide rail 11 forms the positioning convex 111. Alternatively, a positioning pin is provided at one end of the arc-shaped guide rail 11, and the part of the positioning pin that protrudes from the surface of the arc-shaped guide rail 11 forms the positioning convex 111.

In an optional embodiment of the present disclosure, one end of the arc-shaped guide rail 11 is connected with the rim 21, and the other end of the arc-shaped guide rail 11 is far away from the rim 21. In other words, the end of the arc-shaped guide rail 11 far from the rim 21 is a free end. The positioning convex portion 111 is located at the end of the arc-shaped guide rail 11 adjacent to the rim 21.

In an embodiment of the present disclosure, as shown in FIG. 3, the intersection point of the dotted lines in FIG. 3 is the circle center. The distance from the outer edge of the arc-shaped guide rail 11 to the circle center is defined as R. The length of the arc-shaped guide rail 11 is greater than or equal to $(2\pi R)*\frac{1}{4}$. That is, the length of the arc-shaped guide rail 11 is greater than or equal to ¼ of the circumference of a circle having the same radius, so that when the mounting bracket 12 moves on the arc-shaped guide rail 11, the light source output end of the projection assembly 13 forms multiple extension lines at different moments, and the included angle between any two extension lines is 0° to 90°.

In this embodiment, the length of the arc-shaped guide rail 11 is greater than or equal to $(2\pi R)*\frac{1}{4}$, so that the temple 3 can be parallel or vertical to the rim 21, and the glasses can be accommodated completely.

The present disclosure also proposes a pair of glasses, as shown in FIGS. 4, 5, 6 and 7, the glasses comprise a rim assembly 2, temples 3 and at least one projection mechanism 1. With respect to the specific structure of the projection mechanism 1, please refer to the above embodiments. Since the glasses adopt all the technical solutions of the above embodiments, it at least has all the beneficial effects brought by the technical solutions of the above embodiments, which will not be repeated here.

The rim assembly 2 comprises a rim 21 and an optical element 22 arranged on the rim 21. The temple 3 is rotatably connected with the rim 21. The arc-shaped guide rail 11 of the projection mechanism 1 is connected with the rim 21, and the mounting bracket 12 of the projection mechanism 1 is fixedly connected with the temples 3. When the temple 3 is unfolded relative to the rim 21, the light source output end of the projection assembly 13 faces toward the optical element 22.

In this embodiment, the optical element 22 is arranged on the rim 21. When the projection assembly 13 is close to the rim 21, the light source output end of the projection assembly 13 faces toward the optical element 22, so that the optical image can be projected to the optical element 22.

In an optional embodiment of the present disclosure, the optical element 22 is a common planar optical element 22.

In an embodiment of the present disclosure, as shown in FIGS. 4 and 5, the end of the temple 3 that is adjacent to the rim 21 is provided with a mounting slot 31, the mounting bracket 12 is fixedly connected with the inner wall surface of the mounting slot 31, and the light source output end of the projection assembly 13 of the projection mechanism 1 is located at the slot opening of the mounting slot 31.

In this embodiment, the mounting slot 31 is provided on the temple 3, and the mounting bracket 12 partially extends into the mounting slot 31 and is connected with the inner wall surface of the mounting slot 31, so as to protect the mounting bracket 12 and the projection mechanism 1 by the inner wall surface of the mounting slot 31, and prevent the projection mechanism 1 from being damaged by external objects.

In an optional embodiment of the present disclosure, the glasses also comprise a battery and circuit components, which are arranged in the mounting slot 31 and electrically connected with the projection assembly 13.

In an embodiment of the present disclosure, as shown in FIGS. 4 and 5, the rim 21 is provided with a relief hole 211 corresponding to the optical element 22. The glasses also comprise a flexible pipeline 4, one end of which is connected with the peripheral wall of the relief hole 211, the other end of which is connected with the mounting bracket 12 and seals the through hole 121.

In this embodiment, one end of the flexible pipeline 4 is connected with the relief hole 211, and the other end is connected with the through hole 121, so as to form a closed space between the output end of the projection assembly 13 and the rim 21, thereby preventing external dust and debris from entering the projection assembly 13 and thus reducing the interference of dust and debris on the imaging of glasses. At the same time, the flexible pipeline 4 is connected between the rim 21 and the mounting bracket 12, and is also used as a connecting member between the rim 21 and the mounting bracket 12, thereby further improving the positioning accuracy between the rim 21 and the mounting bracket 12.

In an optional embodiment of the present disclosure, the flexible pipeline 4 may be a bellows.

In an embodiment of the present disclosure, as shown in FIGS. 4 and 5, the glasses also comprise a dust-proof net cover 5, which covers the connection part between the rim 21 and the temple 3, thereby effectively reducing dust entering the connection part between the rim 21 and the temple 3.

In an optional embodiment of the present disclosure, the dust-proof net cover 5 is arranged around the flexible pipe 4.

In an embodiment of the present disclosure, as shown in FIGS. 6 and 7, a first mounting projection 212 and a second mounting projection 214 are provided on and protrude from the rim 21. The first mounting projection 212 and the second mounting projection 214 are oppositely arranged and form a movement gap 216 therebetween. The first mounting projection 212 is provided with a first connecting hole 213, the second mounting projection 214 is provided with a second connecting hole 215 corresponding to the first connecting hole 213, and the arc-shaped guide rail 11 is arranged on the first mounting projection 212 or the second mounting projection 214.

The temple 3 is provided with a mounting hole 32 located at the circle center of the arc-shaped guide rail 11. The connecting member passes through the first connecting hole 213, the mounting hole 32 and the second connecting hole 215, so that the temple 3 is rotatably connected with the first mounting table 212 and the second mounting table 214.

In this embodiment, the connecting member passes through the first connecting hole 213, the mounting hole 32 and the second connecting hole 215, so that two side faces of the temple 3 can be rotatably connected with the first mounting table 212 and the second mounting table 214, thereby improving the movement stability between the temple 3 and the rim 21. On the other hand, the arc-shaped guide rail 11 is arranged on the first mounting projection 212 or the second mounting projection 214, and the mounting hole 32 is located at the circle center of the arc-shaped guide rail 11. That is to say, the first connecting hole 213 and the second connecting hole 215 also correspond to the circle center of the arc-shaped guide rail 11. When the temple 3 rotates relative to the rim 21, the mounting bracket 12 can slide smoothly on the arc-shaped guide rail 11 to avoid jamming between the mounting bracket 12 and the arc-shaped guide rail 11.

In an optional embodiment of the present disclosure, the connecting member is a rotating shaft.

In an embodiment of the present disclosure, as shown in FIGS. 6 and 7, the rim assembly 2 comprises two optical elements 22; the glasses comprise two projection mechanisms 1, which are respectively arranged on two sides of the rim 21. Each of the projection mechanisms 1 is connected with one of the temples 3 and is arranged corresponding to one of optical elements 22.

In this embodiment, both sides of the rim 21 are provided with projection mechanisms 1, and two projection mechanisms 1 can respectively project images onto the corresponding optical elements 22. At the same time, the two optical elements 22 correspond to two human eyes respectively, so that the human eyes can simultaneously obtain the images formed by the two optical elements 22.

In an optional embodiment of the present disclosure, the two projection mechanisms 1 are provided mirror-symmetrically.

In an optional embodiment of the present disclosure, as shown in FIGS. 6 and 7, the rim 21 comprises a front rim 218 and a rear rim 217. a first mounting projection 212 and a second mounting projection 214 are provided on and protrude from the rear rim 217. The side of the rear rim 217 that is away from the first mounting projection 212 and the second mounting projection 214 is provided with two first via holes. An optical element 22 is provided in each of the two first via holes. The front rim 218 is connected with the rear rim 217 so that the two optical elements 22 are sandwiched between the front rim 218 and the rear rim 217.

In an optional embodiment of the present disclosure, the front rim 218 is provided with second via holes corresponding to the optical elements 22 one by one.

The above only describes optional embodiments of the present disclosure, and does not limit the scope of the present disclosure. All equivalent structural substitutions made based on the contents of the description and drawings of the present disclosure and under the inventive concept of the present disclosure, or directly/indirectly applications in other relevant technical fields shall be included in the scope of patent protection of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A projection mechanism applied to glasses comprising a rim and temples, comprising:
   an arc-shaped guide rail;
   a mounting bracket slidably arranged on the arc-shaped guide rail and provided with a through hole; and
   a projection assembly inserted in the through hole;
   wherein the arc-shaped guide rail and the mounting bracket are respectively used to connect the rim and the temples, and the mounting bracket can be located at a first position or a second position of the arc-shaped guide rail; when the mounting bracket is located at the first position of the arc-shaped guide rail, a light source output end of the projection assembly faces toward the rim; when the mounting bracket is located at the second position of the arc-shaped guide rail, the projection assembly is far away from the rim.

2. The projection mechanism according to claim 1, wherein the mounting bracket comprises:
   a sliding seat slidably arranged on the arc-shaped guide rail; and
   a mounting seat fixedly connected with the sliding seat and provided with the through hole.

3. The projection mechanism according to claim 2, wherein a positioning convex is provided on and protrudes from a surface of the arc-shaped guide rail, and is located at an end of the arc-shaped guide rail that is adjacent to the rim; and
   when the mounting bracket moves towards the rim along the arc-shaped guide rail, the mounting bracket and the positioning convex are matched for position-limiting.

4. The projection mechanism according to claim 2, wherein the mounting seat comprises:
   a cylinder body provided with the through hole; and
   a seat body that is connected with a circumference of the cylinder body, protrudes from an end of the cylinder body, and is fixedly connected with the sliding seat.

5. The projection mechanism according to claim 4, wherein a positioning convex is provided on and protrudes from a surface of the arc-shaped guide rail, and is located at an end of the arc-shaped guide rail that is adjacent to the rim; and
   when the mounting bracket moves towards the rim along the arc-shaped guide rail, the mounting bracket and the positioning convex are matched for position-limiting.

6. The projection mechanism according to claim 2, wherein a length of the arc-shaped guide rail is greater than or equal to $(2\pi R)*\frac{1}{4}$, where R is a distance from an outer edge to a circle center of the arc-shaped guide rail.

7. The projection mechanism according to claim 4, wherein a length of the arc-shaped guide rail is greater than or equal to $(2\pi R)*\frac{1}{4}$, where R is a distance from an outer edge to a circle center of the arc-shaped guide rail.

8. The projection mechanism according to claim 4, wherein a position-limiting projection is provided on and protrudes from an inner wall surface of the through hole, a position-limiting plane is provided on the projection assembly, and the position-limiting projection and the position-limiting plane are matched for position-limiting.

9. The projection mechanism according to claim 8, wherein a positioning convex is provided on and protrudes from a surface of the arc-shaped guide rail, and is located at an end of the arc-shaped guide rail that is adjacent to the rim; and
   when the mounting bracket moves towards the rim along the arc-shaped guide rail, the mounting bracket and the positioning convex are matched for position-limiting.

10. The projection mechanism according to claim 1, wherein a positioning convex is provided on and protrudes from a surface of the arc-shaped guide rail, and is located at an end of the arc-shaped guide rail that is adjacent to the rim; and
when the mounting bracket moves towards the rim along the arc-shaped guide rail, the mounting bracket and the positioning convex are matched for position-limiting.

11. The projection mechanism according to claim 1, wherein a length of the arc-shaped guide rail is greater than or equal to $(2\pi R)*\frac{1}{4}$, where R is a distance from an outer edge to a circle center of the arc-shaped guide rail.

12. A pair of glasses, comprising:
a rim assembly comprising a rim and an optical element arranged on the rim;
temples rotatably connected with the rim; and
at least one projection mechanism according to claim 1, wherein the arc-shaped guide rail of the projection mechanism is connected with the rim, and the mounting bracket of the projection mechanism is fixedly connected with the temples;
when the temple is unfolded relative to the rim, the light source output end of the projection assembly faces toward the optical element.

13. The glasses according to claim 12, wherein an end of the temple that is adjacent to the rim is provided with a mounting slot, the mounting bracket is fixedly connected with an inner wall surface of the mounting slot, and the light source output end of the projection assembly of the projection mechanism is located at a slot opening of the mounting slot;
and/or, the rim is provided with a relief hole corresponding to the optical element, the glasses also comprise a flexible pipeline, one end of the flexible pipeline is connected with a peripheral wall of the relief hole, the other end of the flexible pipeline is connected with the mounting bracket and seals the through hole;
and/or, the glasses also comprise a dust-proof net cover, which covers a connection part between the rim and the temple.

14. The glasses according to claim 12, wherein a first mounting projection and a second mounting projection are provided on and protrude from the rim, and are oppositely arranged and form a movement gap therebetween, the first mounting projection is provided with a first connecting hole, the second mounting projection is provided with a second connecting hole corresponding to the first connecting hole, and the arc-shaped guide rail is arranged on the first mounting projection or the second mounting projection;
the temple is provided with a mounting hole located at a circle center of the arc-shaped guide rail, and a connecting member passes through the first connecting hole, the mounting hole and the second connecting hole, so that the temple is rotatably connected with the first mounting projection and the second mounting projection.

15. The glasses according to claim 12, wherein the rim assembly comprises two optical elements;
the glasses comprise two projection mechanisms arranged respectively on two sides of the rim, each of the projection mechanisms is connected with one of the temples and is arranged corresponding to one of optical elements.

16. The glasses according to claim 12, wherein the mounting bracket comprises:
a sliding seat slidably arranged on the arc-shaped guide rail; and
a mounting seat fixedly connected with the sliding seat and provided with the through hole.

17. The glasses according to claim 12, wherein the mounting seat comprises:
a cylinder body provided with the through hole; and
a seat body that is connected with a circumference of the cylinder body, protrudes from an end of the cylinder body, and is fixedly connected with the sliding seat.

18. The glasses according to claim 12, wherein a position-limiting projection is provided on and protrudes from an inner wall surface of the through hole, a position-limiting plane is provided on the projection assembly, and the position-limiting projection and the position-limiting plane are matched for position-limiting.

19. The glasses according to claim 12, wherein a positioning convex is provided on and protrudes from a surface of the arc-shaped guide rail, and is located at an end of the arc-shaped guide rail that is adjacent to the rim; and
when the mounting bracket moves towards the rim along the arc-shaped guide rail, the mounting bracket and the positioning convex are matched for position-limiting.

20. The glasses according to claim 12, wherein a length of the arc-shaped guide rail is greater than or equal to $(2\pi R)*\frac{1}{4}$, where R is a distance from an outer edge to a circle center of the arc-shaped guide rail.

* * * * *